United States Patent [19]

Paull et al.

[11] 4,277,365

[45] Jul. 7, 1981

[54] PRODUCTION OF REDUCING GAS

[75] Inventors: Peter L. Paull, Weston, Conn.; Edward T. Child, Tarrytown, N.Y.

[73] Assignee: Texaco Development Corporation, White Plains, N.Y.

[21] Appl. No.: 104,325

[22] Filed: Dec. 17, 1979

Related U.S. Application Data

[63] Continuation of Ser. No. 950,636, Oct. 12, 1978, abandoned.

[51] Int. Cl.$^3$ ............................ C01B 3/34; C10J 3/46
[52] U.S. Cl. .................................. 252/373; 48/197 R; 48/200
[58] Field of Search ...................... 48/197 R, 200, 201, 48/202, 206, 210, 215; 252/373; 201/38

[56] References Cited

U.S. PATENT DOCUMENTS

| | | | |
|---|---|---|---|
| 2,932,561 | 4/1960 | Paull | 48/215 |
| 3,694,373 | 9/1972 | Schlinger et al. | 252/373 |
| 3,847,564 | 11/1974 | Marion et al. | 48/215 |
| 3,884,648 | 5/1975 | Crouch | 252/373 |
| 3,920,579 | 11/1975 | Slater | 252/373 |
| 3,945,942 | 3/1976 | Marion et al. | 48/215 |

Primary Examiner—Peter F. Kratz
Attorney, Agent, or Firm—Carl G. Ries; Robert A. Kulason; Robert Knox, Jr.

[57] ABSTRACT

A reducing gas having a high $H_2+CO$ content and a low $H_2O+CO_2$ content is prepared by gasifying a feed mixture comprising low grade hydrocarbon oil and a high ash solid fuel and a fluxing agent.

8 Claims, No Drawings

PRODUCTION OF REDUCING GAS

This is a continuation of application Ser. No. 950,636, filed Oct. 12, 1978, now abandoned.

This invention relates to a process for the production of a reducing gas from carbonaceous and hydrocarbonaceous fuels by direct partial oxidation with an oxygen-containing gas.

The generation of carbon monoxide and hydrogen by non-catalytic partial oxidation of fuel with oxygen, air or oxygen-enriched air in the presence of steam is known. In the partial oxidation reaction the fuel, usually a fossil fuel is reacted with oxygen and steam in a closed compact reaction zone in the absence of catalyst or packing at an autogenously-maintained temperature within the range of 1800° to 3200° F. preferably 2200° to 2800° F. The reaction zone may be maintained at atmospheric or superatmospheric pressure e.g. above about 10 psig such as from 100 to 1000 psig although recent trends are towards higher operating pressures such as 2500 to 3000 psig. The product gas stream consists primarily of carbon monoxide and hydrogen when the oxidizing medium is oxygen. The product gas also contains smaller amounts of carbon dioxide, and if the feed contains sulfur, small amounts of $H_2S$ and COS. When air or oxygen-enriched air is used as the oxidizing medium, the product gas will also contain nitrogen.

The amount of oxygen supplied to the reaction zone is controlled so that maximum yields of carbon monoxide and hydrogen are obtained. Depending on the desired end product it may be preferable to use high purity oxygen such as an oxygen-rich gas stream containing at least 95 mol % oxygen to produce a gas consisting essentially of carbon monoxide and hydrogen which may be used for the synthesis of organic compounds or if a low BTU fuel gas is the desired product, air or oxygen-enriched air may be used as the oxidizing medium. Typically as a reactant and as a temperature moderator, steam or water is also introduced into the gas generator with the feed.

Ordinarily, it is desirable to operate the synthesis gas generator so that at least about 2% of the carbon content in the fuel feed appears in the product gas as free carbon which may be effectively removed by contacting the gas stream with water in a suitable gas-liquid contact apparatus, for example, a spray tower, a bubble plate contactor or a packed column.

The present invention is directed to the production of a specific type of gas mixture namely a reducing gas capable of being used in reducing reactions such as the reduction of ores. For practical and economic purposes a reducing gas should have a reducing ratio of at least 10, the reducing ratio being defined as the ratio of mols of $CO+H_2$ to mols of $CO_2+H_2O$. Because of this requirement the production of a reducing gas presents problems which are not ordinarily encountered in the production of synthesis gas.

To produce a gas of the desired reducing ratio it is necessary to minimize the content of $CO_2$ and $H_2O$ in the product gas. It is also desirable to keep the free carbon content of the reducing gas to a minimum preferably not greater than 2% of the carbon in the feed.

The production of a reducing gas by the partial oxidation of a fossil fuel is more complicated than the production of synthesis gas by the same reaction. In the conventional manufacture of synthesis gas, free carbon often is deliberately produced. This is not considered undesirable and actually when heavy hydrocarbon oils are used as the feed, steam present in the reaction zone will react with some of the free carbon to form additional CO and $H_2$. Carbon production in synthesis gas generation is therefore not considered harmful. In addition, if it is to be subjected to a shift reaction for the production of hydrogen, synthesis gas is scrubbed with water both for cooling and water saturation and carbon removal.

Since reducing gas is frequently used directly with no intermediate treatment such as carbon removal or cooling between the partial oxidation zone and the reducing zone there are instances where the production of free carbon is undesirable. In situations where it is necessary to cool the reducing gas prior to use the cooling is preferably effected by indirect heat exchange. To cool the reducing by direct heat exchange as by addition of water or by water scrubbing would impair its value as a reducing gas because the gas would then become saturated with moisture which would result in a lowered reducing ratio.

In actual fact, it is possible to scrub the raw product gas with water for cooling purposes and for removal of the carbon. However, as pointed out above, this treatment results in a product which is saturated with water. It is therefore necessary, in order to obtain a satisfactory reducing gas, to further cool the scrubbed gas to condense much of the water contained therein and since a reducing gas is generally used at elevated temperature, it is then necessary to reheat the gas prior to its use. Such a procedure is economically unattractive and it is much more desirable to produce a gas of low carbon content and also low $H_2O$ content as it emerges from the gasification zone.

If sufficient oxygen is added to the feed to convert all of the carbon therein to oxides of carbon, the temperature will rise above the preferred commercial maximum 2800° F. This high temperature ordinarily could be controlled by the addition of a temperature modifying agent such as $H_2O$ or $CO_2$. Unfortunately the presence of such compounds in the product gas again has the effect of lowering the reducing ratio.

It is therefore an object of this invention to produce a reducing gas having a reducing ratio of at least 10. Another object is to produce such a reducing gas at a temperature below about 2800° F. Still another object is to produce a reducing gas using an oxygen to carbon atomic ratio of not greater than 1.2. Still another object is to produce a gas having a reducing ratio of at least 10 by the partial oxidation of a mixture of liquid and solid carbonaceous materials. These and other objects will be obvious to those skilled in the art from the following disclosure.

According to our invention there is provided a process for the production of a reducing gas which comprises subjecting a carbonaceous feed comprising a mixture of a low grade hydrocarbon oil and a finely-divided high ash solid fuel in the presence of $H_2O$ in an amount not greater than 0.19 pound per pound of gasifiable material in the feed to partial oxidation using an oxygen to carbon atomic ratio of less than 1.2 at a temperature between 1800° and 3200° F. to produce a gas which has a reducing ratio of at least 10 and has a free carbon content of less than 2.0% based on the carbon content of the feed.

The feed to the partial oxidation process of our invention comprises a mixture of a low grade hydrocarbon oil and a high ash solid fuel. Examples of low grade hydrocarbon oils are residual petroleum oils, bitumen extract from tar sands, shale oil, solvent-refined coal and the like and mixtures thereof. It is not necessary for the low grade oil to be liquid at room temperature so long as it is liquid at the temperature at which it is introduced into the gasifier. Preheat temperatures as high as 700° F., if desired, may be used.

The solid fuel portion of the feed mixture is a high ash solid fuel having an ash content of at least about 30% by weight. Examples of such solid fuels are South African coal having an ash content of 30%, Province of Alberta coal having an ash content of about 32%, Brazilian coal having an ash content of about 47%, anthracite reject fines having an ash content of about 38% and tar sands having an ash content of about 80%.

The low grade oil in addition to acting as a feed to the process serves as a vehicle for the transportation of the solid fuel. The solid fuel is in finely divided form and should be ground so that at least 80% passes through a 40 mesh sieve preferably 100% passing through a 40 mesh sieve (U.S. standard). The solid fuel and liquid oil are mixed at a temperature at which the oil is liquid in an amount to provide between about 30 and 70 wt.% solid fuel in the mixture. Actually the amount of solid fuel added to the oil is governed by the viscosity of the slurry at the temperature at which it is introduced into the gasifier zone. The addition of an excessive amount of solid material will result in a mixture which is not pumpable. The actual solids content of the mixture will therefore depend on the viscosity of the oil and the temperature at which the mixture or slurry is introduced into the gasification zone.

Also included in the feed is a fluxing agent, for example, an alkali metal carbonate or an alkaline earth metal carbonate, examples of which are $Na_2CO_3$ and $CaCO_3$ or mixtures thereof in an amount between about 1 and 10 wt. % on the total feed preferably between about 1.5 and 6 wt. %. The fluxing agent preferably is added to the feed mixture prior to its introduction into the gasification zone.

The oxygen-containing gas may be substantially pure oxygen, that is, oxygen having a purity of at least 95% preferably at least 99%, oxygen-enriched air e.g. containing 40% oxygen or air. Preferably oxygen is used as the oxidizing medium as otherwise nitrogen serves to act as a diluent for the the reducing gas.

The water present in the gasifier should not exceed 0.19 pound per pound of gasifiable material in the feed, preferably not more than 0.16 pound per pound of gasifiable material. Any $H_2O$ necessary to control the gasifier temperature is preferably introduced with the oxygen.

Pressures in the gasification or partial oxidation zone may range from atmospheric to as high as 250 atmospheres, a preferred range being from 4 to 200 atmospheres. Temperatures ranging from 1800° and 3200° F. may be used although preferably for commercial purposes a range of 2000° to 2800° F. is preferred. The oxygen to carbon atomic ratio may lie between 0.9 and 1.2, a preferred range being 0.95 to 1.1.

The following example is submitted for illustrative purposes only and it should not be construed that the invention is restricted thereto.

This example involves three runs designated A, B and C which are used for comparative purposes. In run A, bitumen obtained by extracting Athabasca tar sand with benzene and then distilling the benzene from the extract is used as the charge stock. In run B a mixture containing 47 wt. % of the bitumen used in run A and 53 wt. % of unextracted tar sand is used as the charge stock and in run C the same charge stock as in run B is also used but in addition, the charge to run C contains 2% by weight of sodium carbonate based on the total charge. The ultimate analyses of the bitumen and tar sand are tabulated below:

TABLE 1

|  | Bitumen | Tar Sand |
|---|---|---|
| Carbon | 83.41 wt. % | 13.3 wt. % |
| Hydrogen | 10.43 wt. % | 1.9 wt. % |
| Nitrogen | 0.36 wt. % | 0.076 wt. % |
| Sulfur | 4.21 wt. % | 0.71 wt. % |
| Oxygen | 0.94 wt. % | 0.27 wt. % |
| Ash | 0.65 wt. % | 83.6 wt. % |

The reactants are introduced into the gasification chamber through an annulus-type burner of the kind shown in U.S. Pat. No. 2,928,460 to Eastman et al. Operating conditions and other data are tabulated below.

TABLE 2

|  | A | B | C |
|---|---|---|---|
| Weight Percent Ash, Feed | 0.65 | 44.47 | 44.47 |
| Feed, Preheat Temperature | 300° F. | 300° F. | 300° F. |
| Oxygen Purity, Percent | 99.6 | 99.6 | 99.6 |
| Oxygen, Preheat Temperature | 250° F. | 250° F. | 250° F. |
| $H_2O$ Pound per Pound | 0.7 | 0.2 | 0.1 |
| O:C Atomic Ratio | 0.94 | 1.015 | 0.971 |
| Pressure, psig | 1200 | 1200 | 1200 |
| Generator Temperature | 2803° F. | 2795° F. | 2753° F. |

TABLE 3

| Product, Gas Composition, mol % | | | |
|---|---|---|---|
| Carbon Monoxide | 36.16 | 43.39 | 49.46 |
| Hydrogen | 38.19 | 38.39 | 40.61 |
| Carbon Dioxide | 6.61 | 5.11 | 2.61 |
| Water | 17.38 | 11.26 | 5.34 |
| Methane | 0.66 | 0.71 | 0.76 |
| Argon | 0.08 | 0.10 | 0.10 |
| Nitrogen | 0.08 | 0.10 | 0.10 |
| Hydrogen Sulfide | 0.80 | 0.89 | 0.96 |
| Carbonyl Sulfide | 0.04 | 0.05 | 0.06 |
| Unconverted Carbon, % of Feed | 1.7 | 0.44 | 1.00 |
| Reducing Ratio | 3.1 | 5.0 | 11.3 |

From the foregoing it can be seen that only in run C is a gas produced having a reducing ratio in excess of 10. In run A in order to keep the temperature at about 2800° or less, actually in this case the temperature is 2803° F., the introduction of 0.7 lb. of $H_2O$ per lb. of gasifiable material with the oxygen results in a product having a reducing ratio of only 3.1. In run B 0.2 lbs. of $H_2O$ per lb. of gasifiable material in the feed holds the temperature to less than 2800° F. or specifically in this run 2795° F. Even so, the reducing ratio of the product is unsatisfactory. However, in run C which contains bitumen, tar sand and a fluxing agent, the addition of only 0.1 lb. of $H_2O$ per lb. of gasifiable material is sufficient to maintain a temperature of well below 2800° F., more specifically 2753° F. Moreover the product gas reducing ratio is 11.3. It is therefore evident form the foregoing that a reducing gas having a reducing ratio of at least 10 may be obtained by charging to a gasifier a mixture of a low grade oil and a high ash solid fuel together with a fluxing agent whereas the low grade oil or the low grade oil in conjunction with a high ash solid fuel is not satisfactory.

Various modifications of the invention as hereinbefore set forth may be made without departing from the spirit and scope thereof, and therefore, only such limitations should be made as are indicated in the appended claims.

We claim:

1. A process for the production of a reducing gas which comprises subjecting a carbonaceous feed consisting essentially of a mixture of a low grade hydrocarbon oil and 30–70 weight percent of a high ash solid fuel containing at least 30 weight percent ash in the presence of $H_2O$ in an amount not greater than 0.19 pound per pound of gasifiable material in the feed to partial oxidation with an oxygen containing gas in the presence of a fluxing agent added in an amount between about 1 and 10 weight percent based on the feed at a temperature between about 2000° and 2800° F. using an O:C atomic ratio of less than 1.2 to produce a reducing gas having a reducing ratio of at least 10 and having a free carbon content of less than 2.0 percent based on the carbon content of the feed.

2. The process of claim 1 in which the oxygen-containing gas is oxygen having a purity of at least 95%.

3. The process of claim 1 in which the O:C atomic ratio is between 0.95 and 1.1.

4. The process of claim 1 in which the fluxing agent is selected from the group consisting of alkali metal carbonates and alkaline earth metal carbonates.

5. The process of claim 4 in which the alkali metal carbonate is sodium carbonate.

6. The process of claim 4 in which the alkaline earth metal carbonate is calcium carbonate.

7. The process of claim 1 in which the feed mixture is preheated to a temperature not greater than about 700° F.

8. The process of claim 1 in which $H_2O$ is present in an amount not greater than 0.15 pound per pound of gasifiable material in the feed.

* * * * *